US 6,353,789 B1

(12) United States Patent
Hanson

(10) Patent No.: US 6,353,789 B1
(45) Date of Patent: Mar. 5, 2002

(54) PREDICTING BROADBAND NOISE FROM A STATOR VANE OF A GAS TURBINE ENGINE

(75) Inventor: Donald B. Hanson, Chester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/459,271

(22) Filed: Dec. 13, 1999

(51) Int. Cl.$^7$ ............................. G01H 11/00; F02R 3/02
(52) U.S. Cl. ..................... 701/100; 60/39.37; 60/39.52; 60/238; 415/76; 103/3; 340/521; 356/375; 324/208
(58) Field of Search ........................... 701/100; 415/119, 415/118; 381/71; 244/1 N; 60/226.1, 204; 181/213

(56) References Cited

U.S. PATENT DOCUMENTS

| 4,242,864 A | * | 1/1981 | Cornett et al. ............. 60/226 R |
| 4,586,139 A | * | 4/1986 | Rosenbush et al. ......... 701/100 |
| 4,896,537 A | * | 1/1990 | Osborne ...................... 73/660 |
| 5,478,199 A | * | 12/1995 | Gliebe ........................ 415/119 |
| 5,791,138 A | * | 8/1998 | Lillibridge et al. ........... 60/262 |
| 5,848,526 A | * | 12/1998 | Hanson ..................... 60/226.1 |
| 5,996,336 A | * | 12/1999 | Hamedani .................. 60/226.1 |

* cited by examiner

Primary Examiner—Tan Nguyen
Assistant Examiner—Tuan C To
(74) Attorney, Agent, or Firm—Bachman & LaPointe, P.C.

(57) ABSTRACT

A computer-implemented model of fan section of a gas turbine engine accounts for the turbulence in the gas flow emanating from the rotor assembly and impinging upon an inlet to the stator vane cascade. The model allows for user-input variations in the sweep and/or lean angles for the stator vanes. The model determines the resulting acoustic response of the fan section as a function of the turbulence and the lean and/or sweep angles of the vanes. The model may be embodied in software that is rapidly executed in a computer. This way, an optimum arrangement in terms of fan noise reduction is quickly determined for the stator vane lean and sweep physical positioning in the fan section of a gas turbine engine.

12 Claims, 9 Drawing Sheets

| | | |
|---|---|---|
| STAGGER ANGLE $\theta$<br>Vane sections at constant radius unwrapped onto $x_d$, $y_d$ plane (duct coordinates).<br>$x_o$, $y_o$ coordinates aligned with vanes at stagger angle $\theta$. $z_d$ and $z_o$ axes aligned with leading edge of reference vane. | 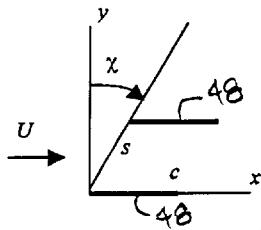 | 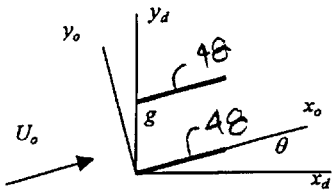 |
| Other views in the $x_o$, $y_o$, $z_o$ system. For the lean and sweep operations to follow, consider the vanes attached to the $y_d$ axis with "hooks". Coordinate systems follow the reference vane; vane #1 stays parallel to ref. vane (hooked at $y_d = g$). | 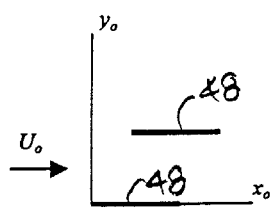 | 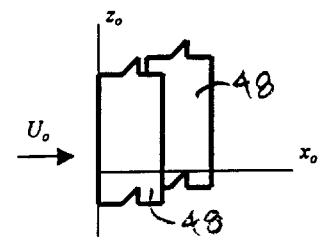 |
| LEAN ANGLE $\psi_l$<br>Lean the reference vane about the $x_o$ axis through angle $\psi_l$. $z'$ axis follows leading edge, $x'$ axis coincides with $x_o$ axis. Because of the "hook", the gap in the $x_d$, $y_d$ system is not changed. | 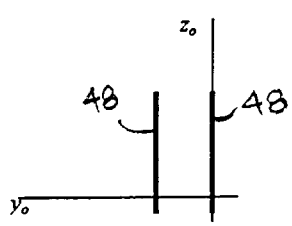 | 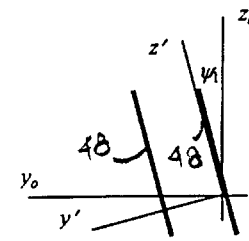 |
| SWEEP ANGLE $\psi_s$<br>Sweep the vane in its own plane through angle $\psi_s$. Velocity vector does not change. $c_d$ is the chord measured at constant radius in the fan.<br>$c = c_d \cos\psi_s$ | 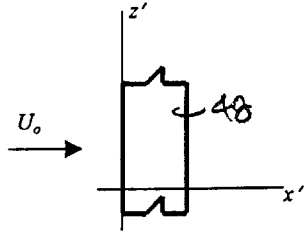 | 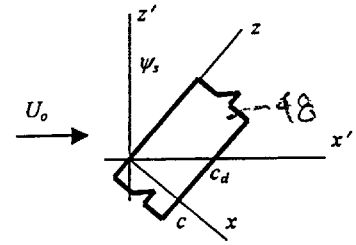 |
| The $x$, $y$, $z$ coordinates are now Glegg's cascade coordinate system. | | 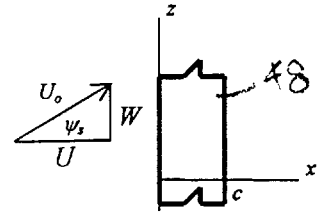 |

FIG. 5

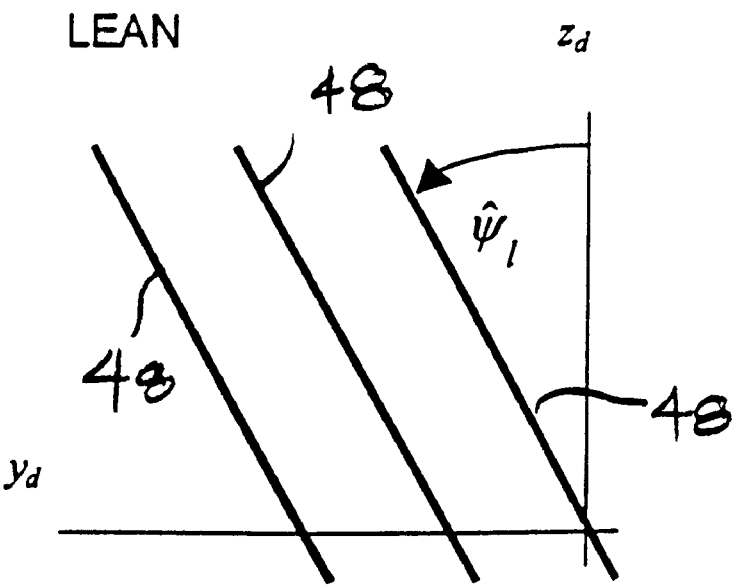
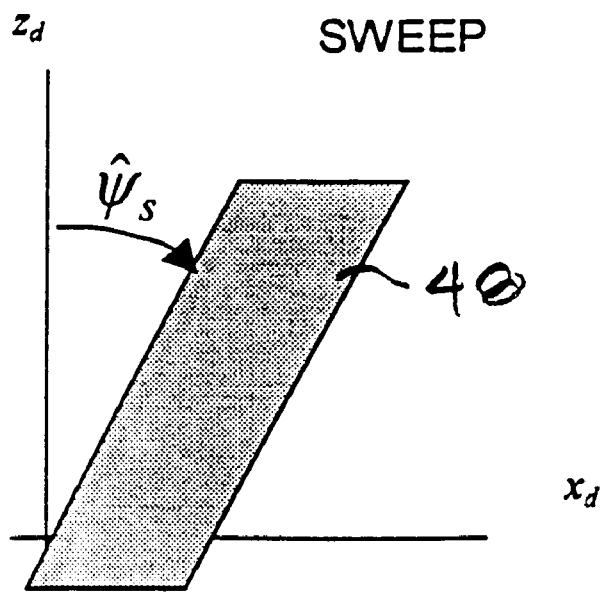
FIG. 7

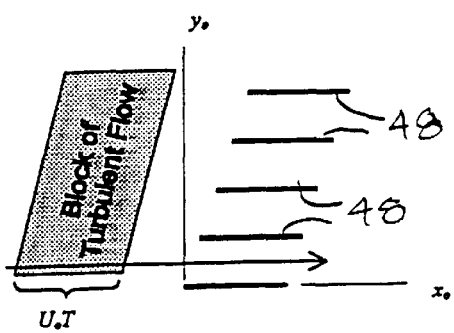
FIG. 8(a)
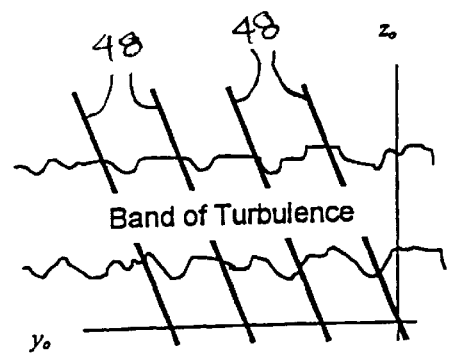
Fig. 8(b)
FIG. 8

```
'Comparison with ADP#1 (722ft/sec) data scaled to 130 inches '
 .80     35.      0.      0.       45      G  theta  PsilD  PsisD  Vanes
 .5006   0.035    0.02                     Mr  L  I
2223.    4.6      2.203   1125.            Po   R   DelR Ao
3                                          Spectrum type: 1 for const BW, 3 for 1/3 OB
         100.     6300.              ** See below for this line
 .80     .80                         DeltaAlf  DeltaNu

** For const BW, input: fl delfreq Nfreq BW
** For 1/3 OB,   input: first freq, last freq  (e.g. 63.  500.)
```

FIG. 9

PREDICTING BROADBAND NOISE FROM A STATOR VANE OF A GAS TURBINE ENGINE

GOVERNMENT RIGHTS

The U.S. Government may have rights in this invention pursuant to NASA contract NAS3-27727.

TECHNICAL FIELD

This invention relates generally to predicting the amount of noise in a gas turbine engine, and more particularly to a computer-implemented method that predicts the amount of broadband noise from the stator vane cascade in a gas turbine engine.

BACKGROUND ART

An aircraft gas turbine engine includes a fan section, a compression section, a combustion section, and a turbine section. An annular flow path for the working medium gases extends axially through the engine. The fan section has a rotor assembly that includes an array of rotor blades that are angled with respect to the approaching gas flow. The fan section also has a stator assembly that includes an array or cascade of stator vanes. Each vane is typically arranged in a radial direction outward from the center axis of the engine. The stator vane cascade is disposed axially downstream of the rotor blade array in the gas flow path. The vanes receive and guide the direction of the flow of gases exiting from the upstream rotor blade array. The stator vanes connect between an outer duct wall and an inner duct wall within the engine. The duct walls extend circumferentially with respect to the flow path to form the boundaries for the working medium gases in the fan section.

As the rotor assembly rotates, the blades do work on the gases to increase the pressure of the gases. The rotor blades also increase the velocity of the gases and direct the flow of gases from the engine axial direction to the blade rotation direction. The gases are then flowed past the rotor blade array to the stator vane cascade, which redirects the flow of gases to the axial direction. By reorienting the flow in this manner, the stator vane cascade increases the recovery of the flow energy of the gases into thrust.

As the working medium gases travel along the engine flow path, the gases are pressurized in the rotating fan and compression sections, which causes the gas temperature to rise. The hot, pressurized gases are burned with fuel in the combustion section to add energy to the gases. The gases are then expanded through the rotating turbine section to produce useful work for pressurizing the gases in the fan and compression sections. The expanding gases also produce thrust for propelling the aircraft forward.

The gas flow through the engine generates acoustic energy or noise. Aircraft engine manufacturers are concerned with the adverse effect of excessive noise levels on passengers, aircraft personnel, and residents in close proximity to airports. Due to increasingly stringent noise restrictions placed upon aircraft that operate in certain geographic areas and at certain times, there is a persistent need for quieter aircraft engines.

The principal sources of noise in an aircraft gas turbine engine are jet or exhaust noise, core noise, and fan noise. Jet noise results from mixing of the high-velocity engine exhaust gas stream with the ambient air. A considerable amount of turbulence is generated when these two streams, which are traveling at different velocities, mix together. This turbulence generates jet noise. In a turbofan engine, there are two exhaust streams; therefore, there are two sources of jet noise. One noise source is the turbulent mixing of the fan exhaust stream with the ambient air. The other noise source is the turbulent mixing of the engine core exhaust stream with the fan exhaust stream and the ambient air.

Core noise consists of compressor noise, combustion noise and turbine noise. Compressor and turbine noise are caused by the unsteady blade forces and fluid stresses when fluids are compressed for driving the turbines. Combustion noise results from the turbulence generated by the burning of fuel in the combustion chamber.

Fan noise is often the predominant noise source in a high-bypass ratio turbofan engine. Fan noise is caused by non-uniform gas flow exiting the rotor blades and impinging upon the stator vanes in the fan section. As each rotor blade passes through the gases, the blade leaves a wake or track of turbulent gases behind it at the trailing edge of the blade. This wake is commonly referred to as the rotor wake turbulent flow. Also, tracks of non-turbulent flow exist between the rotor blade array and stator vane cascade in the areas not directly behind the blades. The turbulent flow impinges on the stator vanes and generates much of the noise radiated by the engine. This fan noise is also commonly referred to as rotor/stator interaction noise.

In addition, secondary flow patterns exist adjacent the tips of the rotor blades due to the interaction of the blade tip with the boundary layer of the engine outer duct wall. This interaction introduces further turbulence (i.e., "tip vortex") into the wake turbulent flow at the blade tip region. Also, turbulent flow emanates from the hub or root portion of the rotor blade (i.e., "hub vortex"). The wake turbulent flow (i.e., "downwash") from rotor blades sweeping past stator vanes produces pressure fluctuations on the vane surfaces. These fluctuating aerodynamic pressures on the vane surfaces produce forces that generate noise.

The rotor blade wake turbulent flow has a steady component and a random component. The steady component is also commonly referred to as the harmonic or periodic wake component.

The random component is also commonly referred to as the broadband wake component. The random component is represented by the turbulent kinetic energy, which varies dramatically across the span of the stator vane inlet. The turbulent kinetic energy is often greater at the root or hub and tip regions of the rotor blade as opposed to the mid-span region of the rotor blade. The turbulent kinetic energy present in the blade root region is typically attenuated as it is absorbed downstream in the low-pressure compressor section of the engine.

The harmonic and broadband components of the wake turbulent flow are related to the noise spectrum components. The harmonic wake component causes harmonic or tonal noise and the broadband wake component causes broadband noise. Tonal noise is noise at specific frequencies, which are multiples of the rotor blade passage frequency. This tonal noise has a distinct sound that can be heard above the background noises. The amount of tonal noise generally depends upon the number of stator vanes and rotor blades, the geometry of the duct walls bounding the flow path for the working medium gases, the velocity of the gases, and the rotor speed. On the other hand, broadband noise is distributed over a wide range of frequencies, rather than being at specific, discrete frequencies. The noise signatures of modem turbofan engines tend to be dominated by broadband noise.

It is difficult to suppress or attenuate fan noise because of the interdependence of the mechanisms that contribute to this noise and the basic aerodynamic operation of the fan section of the engine. The prior art contains noise suppression structures adapted specifically for retrofit or original fit on an aircraft gas turbine engine. Typically, the noise suppression structure consists of sound attenuating liners applied to the nose cowl, the nose dome and the fan flow path components of the engine. In typical constructions, the sound absorption material lines the inlet duct and nozzle of a turbojet or turbofan engine to suppress the noise generated within the flow path. However, significant aerodynamic losses (e.g., thrust) result from the addition of noise suppression structures that provide for acceptable levels of tonal and broadband noise.

Another known method of attempting to reduce the fan noise involves selecting blade/vane ratios to satisfy the cut off criterion for propagation of noise at the fundamental rotor frequency. It is also known to increase the axial spacing between the rotor assembly and the stator assembly to reduce fan noise.

The aerospace community is aware of the potential for reducing the tonal noise component of the turbulent rotor wake by adjusting the angular physical positioning of the stator vanes in one or both of two different angular directions. This angular physical positioning is known as "lean" and "sweep". Vane sweep is the axial displacement of the vane such that the tip region of the vane is disposed farther downstream axially than the vane hub. Correspondingly, vane lean is a circumferential displacement of the vane stacking line relative to the radial direction of the vane. Lean of the vane tips is normally in the direction of blade rotation. Sweep and lean vane positioning may be performed independent of each other, or they may be done simultaneously. Swept and/or leaned stator vanes reduce tonal noise by reducing the severity of the rotor wake interaction with the vanes. The axial spacing (i.e., upstream, downstream) of the rotor assembly with respect to the stator assembly may also typically be varied with various sweep and/or lean configurations.

Recent empirical laboratory testing of an engine fan section has revealed the unexpected potential for use of stator vane sweep and/or lean physical positioning to reduce the broadband noise component of the rotor turbulent wake flow. See Woodward, R. P., et al., "Benefits of Swept and Leaned Stators for Fan Noise Reduction", AIAA Paper 99-0479, presented at the 37$^{th}$ Aerospace Sciences Meeting and Exhibit, 1999, Reno, Nev., Jan. 11–14. Therein it was described that sweep only, and sweep together with lean, were both effective for reducing the amount of broadband noise at the stator vane inlet. The quantity of measured broadband noise was given as a function of various lean and sweep angles. The acoustic response results revealed significant reductions in both tonal noise and broadband noise beyond what could be achieved through the conventional approach of increasing the axial spacing between the rotor assembly and stator assembly.

Yet, instead of attempting to determine optimum vane sweep and/or lean positioning through the trial and error empirical testing approach, it is desired to accurately model various vane sweep and lean angles and the resulting acoustic response of the fan section. This is done in the present invention to accurately predict the amount of broadband noise for various sweep and/or lean angles. The model may be embodied in software that is rapidly executed in a computer implementation of the model. This way, an optimum arrangement in terms of fan noise reduction is quickly determined for the stator vane lean and sweep physical positioning in the fan section of a gas turbine engine.

DISCLOSURE OF INVENTION

An object of the present invention is to provide a computer-implemented method for accurately predicting the amount of broadband noise at the inlet of a stator vane cascade of a gas turbine engine.

According to the present invention, a model of a fan section of a gas turbine engine accounts for turbulence in the gas flow emanating from the rotor assembly and impinging upon the stator vane cascade at the inlet thereof. The model also allows for variations in the sweep and lean angles of the stator vanes. The model determines the resulting acoustic response of the fan section as a function of the turbulence and the lean and/or sweep angles of the vanes. The model may be embodied in software that is rapidly executed in a computer or workstation. The user enters desired values for the turbulence and the vane lean and/or sweep angles. The computer executes the program instructions embodying the model to solve the equations for the acoustic response of the stator vane. This way, an optimum arrangement in terms of fan noise reduction is rapidly determined for the stator vane lean and sweep physical positioning in the fan section of a gas turbine engine.

The present invention has a practical application and utility in that it provides for a computer-implemented tool to assist gas turbine engine designers in designing the fan section. The present invention allows the designer to "virtually design" certain aspects of the stator vane cascade using a computer model, to achieve a minimum or optimum amount of fan noise emanating from the engine. Specifically, it allows the designer to vary the lean and/or sweep angles of the stator vanes, and then to assess the effect of those angles on the amount of fan noise generated by the interaction of the rotor wake turbulence with the stator vane cascade. This type of "what if" analysis can be performed relatively much more accurately, rapidly and inexpensively in a virtual computing environment, as compared to a traditional laboratory empirical "trial and error" approach.

The above and other objects, advantages and features of the present invention will become more readily apparent when the following description of exemplary embodiments of the present invention is read in conjunction with the accompanying drawings.

BRIEF DESCRIPTION OF DRAWINGS

FIG. 5 includes various graphs that illustrate the sequence of rotations that relate cascade coordinates to duct coordinates with respect to stator vanes in the cascade of FIG. 1;

FIG. 7 includes graphs that illustrate lean and sweep angles as defined via front and side views of stator vanes in the cascade of FIG. 1;

FIG. 8 include graphs that illustrate the turbulent gas flow from the rotor blade array impinging on stator vanes in the cascade of FIG. 1; and FIG. 9 is a listing of a computer input file containing exemplary values for various parameters used by a computer program executing on the workstation of FIG. 3 in determining the acoustic response of the stator vane cascade of FIG. 1.

EXEMPLARY EMBODIMENTS OF THE PRESENT INVENTION

Figure 1:
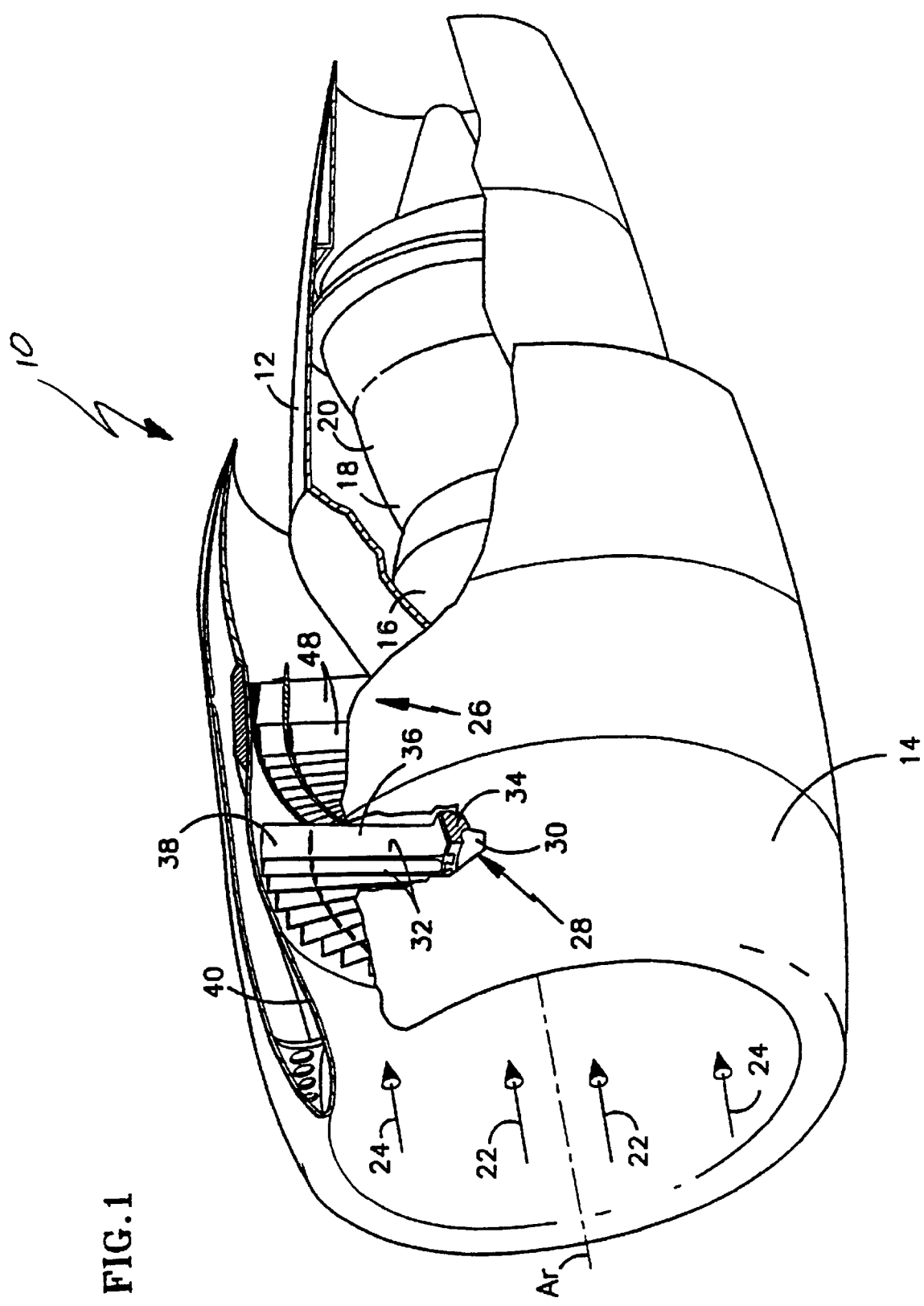
FIG. 1 is a perspective view, partially cut away, of a gas turbine engine of the axial flow, turbofan type having a rotor blade array and a stator vane cascade.

FIG. 1 illustrates a gas turbine engine 10 of the axial flow, turbofan type having an axis of rotation, $A_r$. The engine 10 may comprise the model PW4000 commercial aircraft gas turbine engine, provided by the Pratt & Whitney division of United Technologies Corporation, the assignee of the present invention. A nacelle 12 surrounds the engine 10 and is adapted to both support and position the engine from a structure such as an aircraft wing (not shown). The engine 10 includes a fan section 14, a compressor section 16, a combustion section 18, and a turbine section 20. A primary annular flow path 22 for working medium gases extends through these sections 14–20. A secondary annular flow path 24 for working medium gases is disposed radially outward of the primary flow path 22.

The engine 10 includes a stator assembly 26 extending circumferentially about the engine axis of rotation. The engine 10 also includes a rotor assembly 28 disposed about the engine axis of rotation. The rotor assembly 28 includes a rotor disk 30 and an array of rotor blades 32. Each rotor blade 32 has a root or hub region 34, a mid-span region 36, and a tip region 38. Each rotor blade 32 extends outwardly from the rotor disk 30 across the working medium flow paths 22, 24.

The engine 10 also includes an outer duct wall 40 that extends circumferentially about the engine axis of rotation. The outer wall 40 outwardly bounds the secondary annular flow path 24 for the working medium gases. The tip region 38 of each rotor blade 32 is in close proximity with the outer wall 40. An inner wall 42 (FIG. 2) is spaced radially inwardly from the outer wall 40. The inner wall 42 extends circumferentially about the engine axis of rotation and inwardly bounds the secondary annular flow path 24 for the working medium gases.

The stator assembly 26 includes an array or cascade of stator vanes 48 spaced axially downstream from the rotor blade array 28. Each stator vane 48 extends radially between the outer and inner duct walls 40, 42 and across the secondary annular flow path 24. A stator vane 48 has a radial span that may be measured at the leading edge of the vane.

Figure 2:
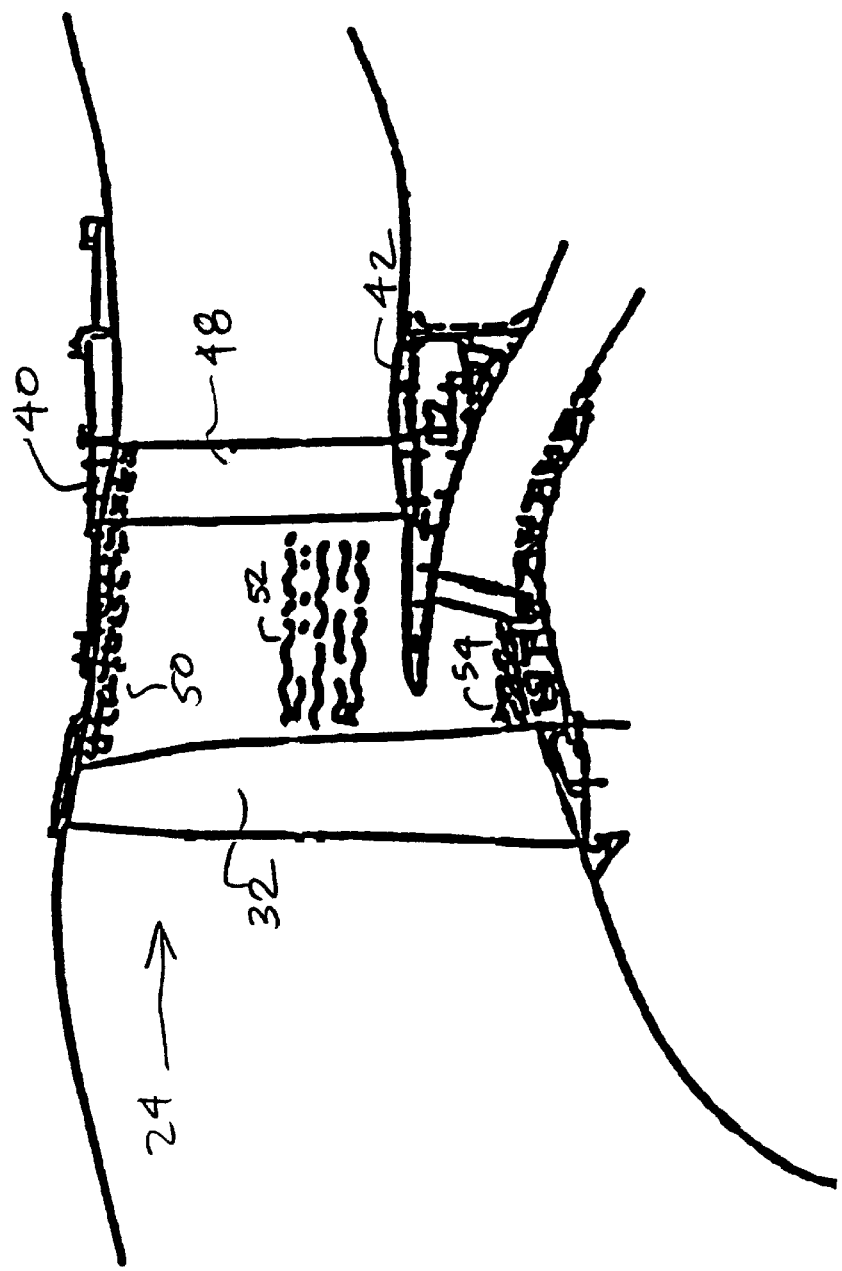
FIG. 2 is a side view of a rotor blade and a stator vane within the engine of FIG. 1, and illustrating the various components of the turbulent gas flow in the rotor blade wake as it impinges upon the stator vane.

FIG. 2 is a simplified side view of a portion of the turbofan engine 10 illustrating a rotor blade 32 and a stator vane 48 disposed in the secondary annular flow path 24. The stator vane 48 is illustrated in a common radial orientation connected between the outer and inner duct walls 40, 42. Also illustrated are the elements of the rotor blade turbulent wake, including the tip vortex or wakes 50, the med-span wakes 52, and the hub or root vortex 54. These non-uniform turbulent flow components in the rotor blade wake impinge on the stator vanes 48, and may generate most of the noise radiated by the engine 10.

The wake includes a periodic component, which generates harmonic noise, and a random component, which generates broadband noise. The present invention focuses exclusively on predicting the broadband noise component for various angular positions of the stator vanes 48. The random flow is considered to be turbulent, ignoring any random instability effects. Generally, the rotor exit flow is highly inhomogeneous because the turbulent blade wakes 50–54 are not mixed and fully merged with each other. Also, bands of turbulence exist at both the outer and inner walls 40, 42. The statistics of this turbulence, like those of the mid-span wakes 52, exhibit a blade-to-blade periodicity.

An analytical model is developed herein for predicting the amount of noise generated by the rotor wake turbulence at the inlet to the stator vane cascade. The model treats rotor wake turbulence via three-dimensional spectra and covariance functions. Special attention is paid to effects of lean and sweep angular positioning of the stator vanes and to inhomogeneity of the turbulence. The result of this rigorous analysis is several tractable mathematical equations that predict the sound power spectra upstream and downstream of the stator vane cascade as an integral over the wavenumbers of the incoming rotor wake turbulence field. The sound power equations are also functions of various numerical values for stator vane sweep and/or lean angles. The equations are program coded in software for execution on a computer for solution thereby. In an exemplary embodiment, the equations are coded in Fortran and run on a commercially available workstations or personal computer 70.

Figure 3:
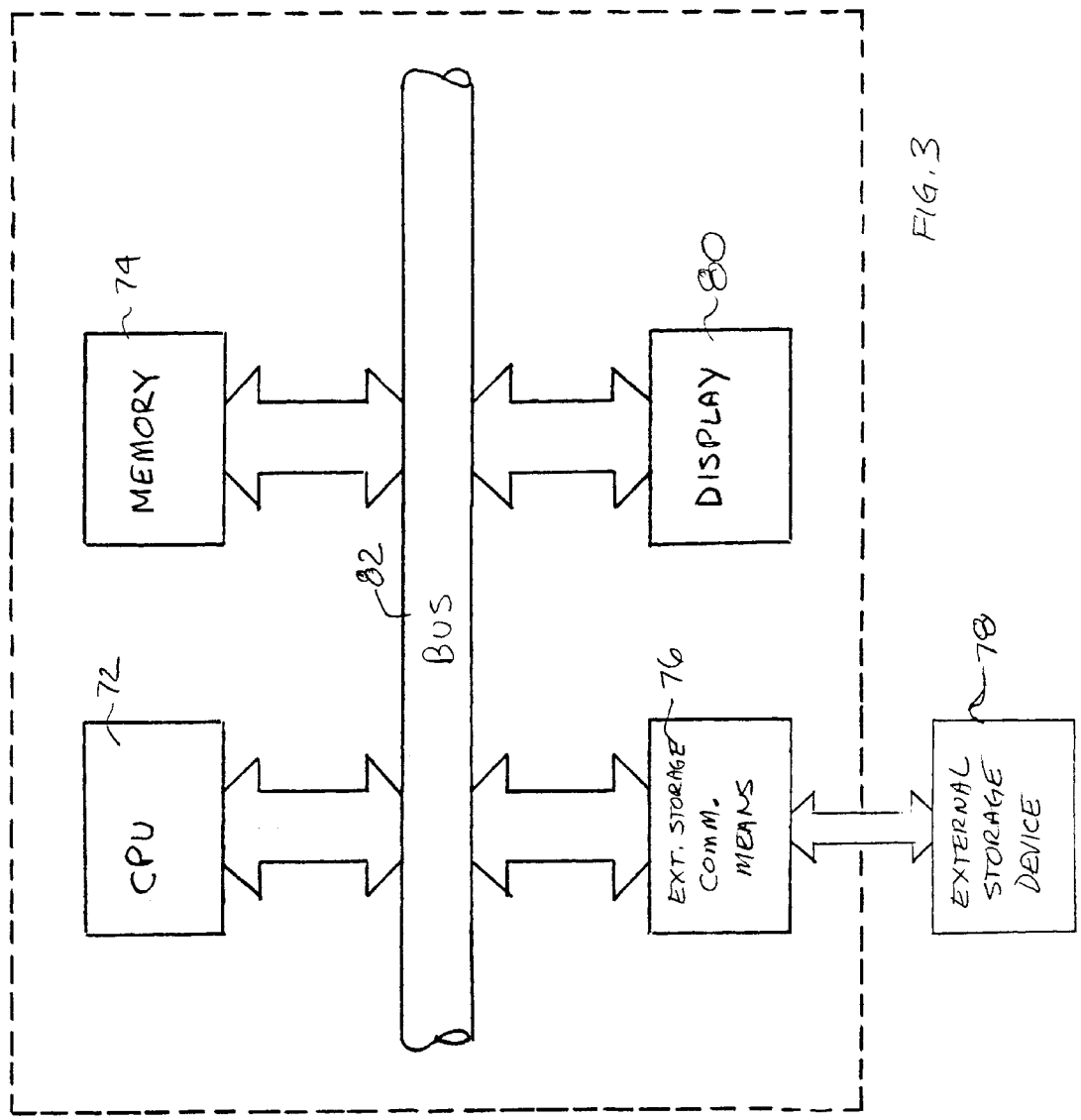
FIG. 3 is a block diagram of a computer workstation having a central processing unit for executing instructions that implement the noise prediction model of the present invention.

Referring to FIG. 3, there illustrated is a simplified block diagram of the workstation 70 available from, e.g., Sun Microsystems or Silicon Graphics. The workstation 70 includes a central processing unit ("CPU") 72, which may comprise the Intel Pentium microprocessor. The workstation 70 also includes various types of memory 74 for storing different types of information and data, including, for example, instructions executed by the CPU 72 and the results of calculations performed by the CPU. The various known types of memory 74 may comprise read only memory ("ROM"), random access memory ("RAM"), and electrically programmable read only memory ("EPROM").

The workstation 70 also includes the means 76 for communicating with external storage devices 78. These devices 78 typically include various known types of storage media, including floppy disks and CD-ROMs. The devices 78 may store the underlying functional instructions and accompanying data that comprise the noise prediction modeling software of the present invention. The stored instructions may be executed by the CPU 72. The means for communicating 76 with these devices 78 handles the reading and/or writing of information to and from these external storage devices 78.

A visual display device 80, such as a CRT monitor, is typically included as part of the workstation 70. The monitor 80 displays various types of visual information to the workstation user, including graphical data illustrating the amount of noise at the inlet of the stator vane cascade for various lean and/or sweep vane angles. The CPU 72, memory 74, external storage communication means 76, and visual display device 80 may communicate with each other via a bus 82, which comprises a plurality of communication signal lines.

In operation of an exemplary embodiment of the present invention, the analytical model described in detail hereinafter yields one or more equations that calculate the amount of noise at the inlet of the stator vane cascade. The equations are coded in the Fortran software language, although any suitable programming language may be used. The user then inputs into the computer program values for various parameters (e.g., turbulence, stator vane lean and/or sweep angles) needed to calculate the acoustic response of the cascade. The CPU 72 performs the calculations, and a visual output of the results of the calculations is provided on the display screen 80. The use may then modify one or more of the various parameter values and re-execute the calculations. This can be done until an optimum or minimum desired value for the amount of stator vane inlet noise is achieved.

With respect to the analytical model developed herein, the only simplification regarding representation of the rotor wake turbulence is use of Taylor's hypothesis (i.e., the frozen gust assumption). This reduces the turbulence representation from a four-dimensional wavenumber-frequency spectrum to a three-dimensional wavenumber spectrum and results in manageable noise equations. The principal simplification regarding geometry is use of a rectilinear stator vane cascade model. At low frequencies, this may be problematical. However, at mid and high frequencies where noise generation is dominated by small scale eddies, the rectilinear cascade approximation should be acceptable.

The relatively complex analytical derivation of the noise prediction model of the present invention starts with a known, wake impingement analysis model. See Glegg, S. A. L., "The Response of a Blade Row to a Three Dimensional Gus", Florida Atlantic University Report, September 1996. This model is hereafter referred to as the "Glegg model". The subsequent mathematical analysis presented herein develops the sound power equations from the Glegg model.

The Glegg model essentially comprises a flat plate, rectilinear cascade acoustic response theory. This theory includes a spanwise flow component for treatment of the sweep effect, and a spanwise wavenumber component, in addition to the usual streamwise and gapwise wavenumber components. Glegg's theory is for waves that are sinusoidal in space and time. The following mathematical analysis connects Glegg's theory to the turbulence interaction problem. The resulting equations give the spectra of upstream and downstream sound power generated by rotor exit wake turbulence. Inhomogeneity is dealt with in terms of integrals of the turbulence covariance function, or of the turbulence spectrum function, at the stator cascade face. Use of the resulting noise prediction model theory of the present invention is described and illustrated herein by a simple application of the Liepmann turbulence spectrum for homogeneous turbulence, in place of the general turbulence spectrum. This teaches one of ordinary skill in the art how to integrate over a turbulence field and how to transform wavenumbers for turbulence represented in different coordinate systems (i.e., the "cascade" and duct coordinate systems described in detail hereinafter).

Figure 4:
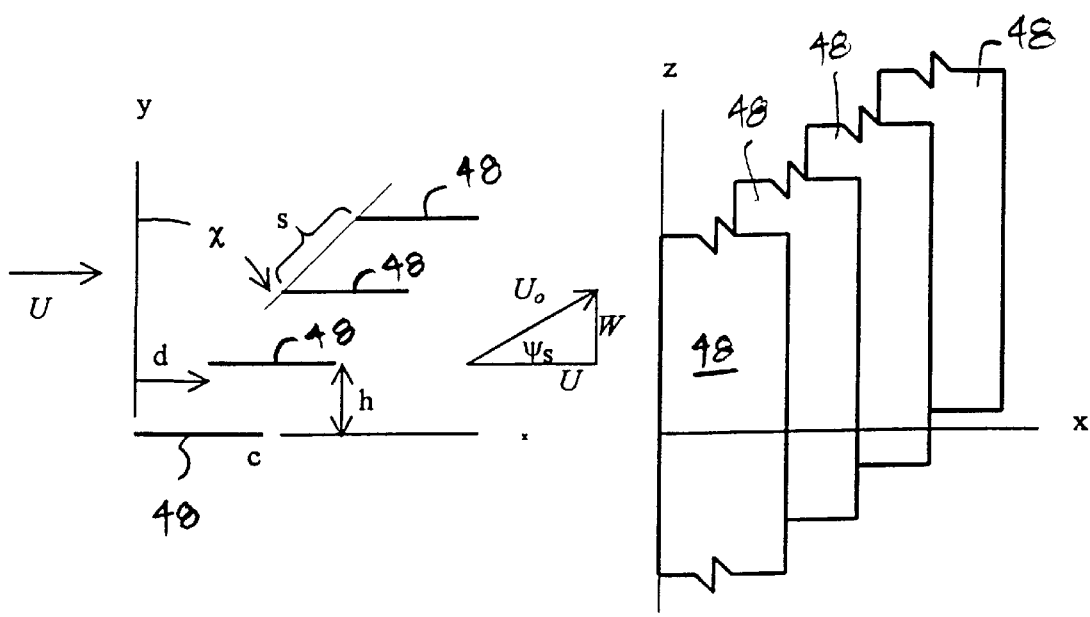
FIG. 4 includes various graphs and a diagram that illustrate various geometrical components of the gas flow of FIG. 2 with respect to a stator vane cascade of FIG. 1.

For background information on the Glegg model, reference is made to FIG. 4, which illustrates four stator vanes 48 in the cascade (FIG. 1). Geometry is constant in the z direction and the background flow is uniform, U=(U, 0, R). The stator vanes 48 are shown as unloaded flat plates. Cascade gap (i.e., the distance between vanes 48), chord, and stagger angle (with respect to the y axis) are indicated thereon as s, c, and X, respectively. The unsteady flow is harmonic in space and time with upwash given by:

$$w(x,t) = w_0 e^{i(\gamma_0 x + \alpha y + vz - \omega t)} \quad (1)$$

This equation represents a plane wave that is harmonic in time with frequency $\omega/2\pi$ and upwash complex amplitude $w_0$. It is also harmonic in space with x, y, and z wave numbers equal to $\gamma_0$, $\alpha$, and $v$. By use of Wiener-Hopf analysis, Glegg derived an equation equivalent to the following for the velocity potential of the scattered acoustic waves.

$$\phi^{\pm}(x,t) = \pm \frac{\pi w_0 c^2}{\beta s_e} \sum_{k=-\infty}^{\infty} \frac{\zeta_k^{\pm} D(\lambda_k^{\pm})}{\sqrt{\kappa_e^2 - f_k^2}} e^{i[-\lambda_k^{\pm}(x-yd/h)+(\sigma-2\pi k)y/h+vz]} e^{-i\omega t} \quad (2)$$

Where $$M = U/a \quad \beta = \sqrt{1-M^2} \quad \omega_g = \omega - Wv \quad (3)$$

$$s_e = \sqrt{d^2 + \beta^2 h^2} \quad \tan\chi_e = d/\beta h \quad \lambda_k^{\pm} = \kappa M + \eta_k^{\pm} \quad (4)$$

$$\zeta_k^{\pm} = \beta\sqrt{\kappa_e^2 - (\eta_k^{\pm})^2} \quad \kappa_e^2 = \kappa^2 - (v/\beta)^2 \quad \kappa = \omega_g/(a\beta^2) \quad (5)$$

$$\eta_k^{\pm} = -f_k \sin\chi_e \pm \cos\chi_e \sqrt{\kappa_e^2 - f_k^2} \quad f_k = (\sigma - 2\pi k + \kappa M d)/s_e \quad (6)$$

and $\sigma = \gamma_0 d + \alpha h$ is the interblade phase angle. D is the Fourier transform of the discontinuity in potential across the blade 32 and wakes (in the form of an infinite product), and is the primary result of Glegg's derivation. The velocity, pressure, and density perturbations associated with the acoustic wave can be obtained from Equation 2 via:

$$u = \nabla\phi \quad p = -\rho_0 D\phi/Dt \quad \rho' = p/a^2 \quad (7)$$

where $\rho_0$ and $a$ are the ambient density and speed of sound, respectively. Glegg's notation is adhered to closely. However, Glegg used $\omega'$ for the radian frequency (herein it is $\omega$), $\omega$ for the shifted frequency (herein it is $\omega g$), and m for the scattering index (herein it is k). Also, the D function of this report is non-dimensional; thus, to obtain the D function of Glegg's report, multiply the non-dimensional version by $w_0 c^2$.

The equations above yield the acoustic waves scattered by the stator vane cascade for a single, planar wave input. Scattering index k runs over an infinite range, but, as usual in this kind of formulation, only a finite number of waves are cut on (propagate undiminished); the remaining waves decay exponentially and, thus, carry no acoustic energy. Cuton is governed by the argument of the square root $$\sqrt{\kappa_e^2 - f_k^2}.$$

When the frequency is high enough, the argument is positive and the waves are cut on. The exponential dependence on the space and time variables in Equation 1 permits treatment of any inflow field via standard Fourier transform methods, as shown as follows.

The analysis in support of the development of the noise prediction model of the present invention requires four coordinate systems: a first is aligned with the fan duct for the lean/sweep definition; a second is aligned with the mean flow and the fan radius for the generalized turbulence description; a third is aligned with the mean flow and the vane normals to apply a classic upwash turbulence spectrum; and a fourth is aligned with the cascade geometry to apply Glegg's theory. The transformations and lean/sweep conventions are defined herein, and the most important geometrical relations between the chord, gap, and stagger in the duct coordinate system and the cascade coordinate system are summarized. Lean and sweep are also defined in two different coordinate conventions.

The coordinate systems are shown in FIG. 5. Stagger, lean, and sweep angles are defined via an ordered sequence of rotations about coordinate axes as follows. The top of FIG. 5 represents the stator vane 48 cut at constant radius and unwrapped onto the plane of the paper. The $z_d$ and $z_0$ axes are coincident with each other and with a fan radius. Mean flow $U_0$ is aligned with the $x_0$ direction and has no radial component. In the transformations that follow, the reference vane (vane #0 which passes through the origin) and vane #1 are handled differently. To visualize the rotations, the reference vane is rotated and then the coordinate system is rotated to re-align the z axis with the leading edge of the reference vane.

The other vanes 48 have hooks on their leading edges attaching them to the $y_d$ axis with a separation g that does not change. Thus, throughout the lean and sweep rotations, the vanes 48 always penetrate the constant radius plane ($z_0=0$) at the location and orientation given by g and θ at the top right of FIG. 4.

Figure 6:
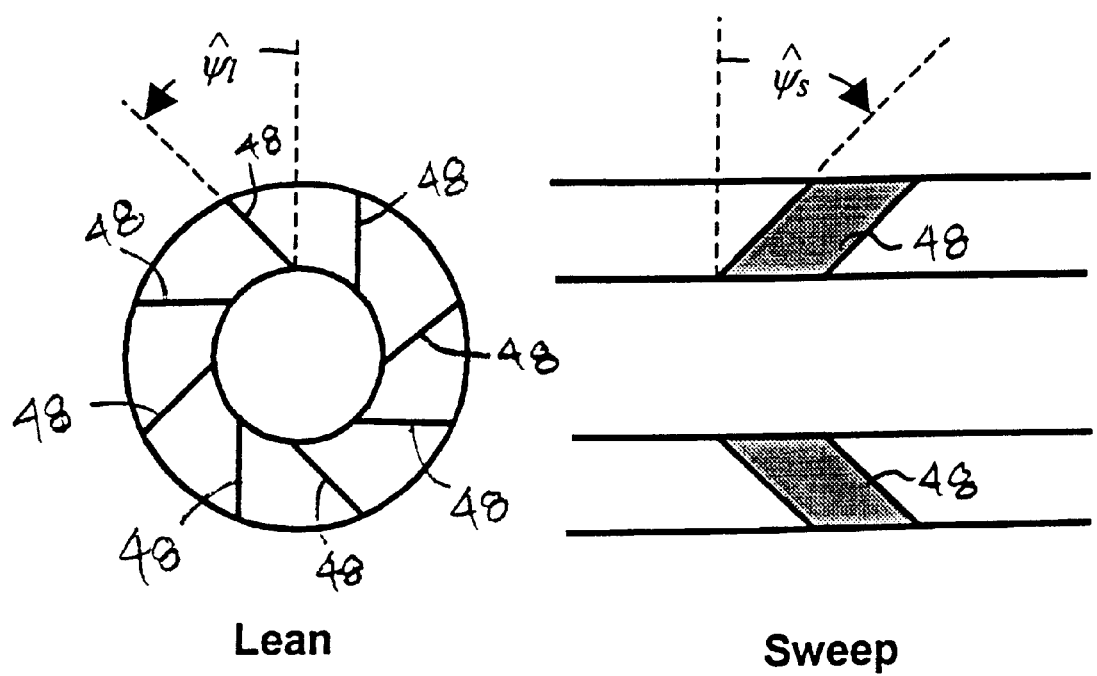
FIG. 6 includes graphs that illustrate exemplary lean and sweep angles for the stator vanes in the cascade of FIG. 1.

Referring also to FIGS. 6 and 7, lean is an out-of-plane rotation of the vane 48 about the $x_0$ axis through angle $\psi_l$. Lean does not change the component of inflow mean velocity normal to the leading edge. Sweep is an in plane rotation of the vane 48 about the y' axis through angle $\psi_s$. Sweep reduces the flow component normal to the leading edge by the factor cos $\psi_s$. Relationships between the velocity components can be deduced from FIG. 5, as can the relation between the chords c and $c_d$.

Glegg's stagger dimensions in FIG. 4 are given by:

$$d = (\sin θ \cos \psi_s - \cos θ \sin \psi_l \sin \psi_s)g$$

$$h = (\cos θ \cos \psi_l)g \quad (8)$$

From these, Glegg's gap and stagger angle are given by:

$$s = \sqrt{d^2 + h^2} \quad (9)$$

$$\tan \chi = \frac{d}{h} \quad (10)$$

The chord relation is: (11)
Where $C_d$ is chord measured atconstant radius (along the flow direction). The velocity components are related to the total mean inflow velocity $U_0$ by $$U = U_0 \cos \psi_s$$

$$W = U_0 \sin \psi_s \quad (12)$$

The lean and sweep angles can also be defined by a convention more suitable to viewing on design drawings. In FIG. 7, the stator vane cascade is viewed along the fan axis of rotation for lean and from the side (similar to FIG. 2) for sweep.

The lean and sweep angles have "hats" in the following equations to distinguish them from the corresponding lean and sweep angles in FIG. 5. The relationship between the two systems is given by:

$$\tan \psi_l = \cos θ \tan \hat{\psi}_l - \sin θ \tan \hat{\psi}_s$$

$$\tan \psi_s = \cos \psi_l (\sin θ \tan \hat{\psi}_l + \cos θ \tan \hat{\psi}_s) \quad (13)$$

Thus, the lean and sweep angles in the "duct system" in FIG. 7 can be converted to the "no hat" system for use with Equations 8–12. Equations 13 must be solved sequentially.

Glegg's theory was written for three-dimensional, planar, harmonic waves. Glegg's theory can be extended to an input having any waveform and spatial distribution via the following Fourier transform:

$$w(x,t) = \int\int W(K,\omega) e^{i(K \cdot x - \omega t)} dK d\omega \quad (14)$$

where here, and throughout this mathematical analysis, integration limits are from $-\infty$ to $\infty$) unless otherwise specified. Vector wavenumber K is shorthand for ($\gamma_0, \alpha, \nu$). For discussion hereinafter, the inverse of Equation 14 is:

$$W(K, \omega) = \frac{1}{(2\pi)^4} \int\int w(x, t) e^{-i(K \cdot r - \omega t)} dx dt \quad (15)$$

To insure convergence of this integral, gust velocity w is considered to be non-zero for a large, but finite, block of fluid and for the associated time, T, required for that flow to pass the stator vane cascade at speed $U_0$. Later, T and the fluid volume will approach infinity as a limit. The limiting process will become more precise as the derivation proceeds. With the application of Equation 14 to Equation 2, Glegg's potential can be generalized to:

$$\phi = (x,t) = \int \Phi = (x,\omega) e^{-\omega t} d\omega \quad (16)$$

where $$\Phi^{\pm}(x, \omega) = \quad (17)$$

$$\pm \frac{\pi c^2}{\beta s_e} \int W(K, \omega) \sum_{k=-\infty}^{\infty} \frac{\zeta_k^{\pm} D(\lambda_k^{\pm})}{\sqrt{\kappa_e^2 - f_k^2}} e^{i[-\lambda_k^{\pm}(x - yd/h) + (\sigma - 2\pi k)y/h + \nu z]} dK$$

It is desired to compute the spectrum of sound power scattered by the stator vane cascade. The starting point is the expression for the acoustic energy flux vector applicable It is desired to compute the spectrum of sound power scattered by the stator vane cascade. The starting point is the expression for the acoustic energy flux vector applicable to waves in a uniformly moving medium with mean properties given by the density $\rho_0$, speed of sound a, and velocity U (see Goldstein, M. E., "Aeroacoustics", McGraw-Hill, New York, 1976).

$$I = \left(\frac{p}{\rho_0} + U \cdot u\right)(\rho_0 u + U\rho') \quad (18)$$

This is the time dependent power per unit area in terms of the acoustic pressure, density, and velocity, p, ρ', and u, respectively. The desired form for spectrum of sound power flux based on velocity potential is:

$$I_\omega = \frac{-i2\pi\rho_0}{T} \omega \Phi^* \left[\nabla \Phi + \frac{U}{a^2}(i\omega\Phi - U \cdot \nabla \Phi)\right] \quad (19)$$

This is the local (dependent on position variables) power flux vector per unit frequency. The following equation is used to find the acoustic power leaving the stator vane cascade (i.e., downstream of the cascade):

$$I_\omega^{\pm} = I_\omega \cdot \hat{n}^{\pm} \quad (20)$$

Then, integrate over the cascade frontal area. $\hat{n}^{\pm} = \pm(-h/s, d/s, 0)$ are the unit normal vectors for a plane parallel to the cascade leading edge. The signs +/- correspond to normals on the upstream/downstream sides of the plane. By applying Equation 19 to Equation 17 and performing the indicated dot product, the result is:

$$I_\omega^{\pm} = \frac{-i2\pi\rho_0}{T} \frac{\pi^2 c^4 \omega}{\beta^2 s_e^2} \quad (21)$$

-continued $$\int\int W^*(K,\omega)W(K',\omega)\sum_k\sum_{k'}\frac{\zeta_k^\pm \zeta_{k'}^{\prime\pm} D^*(\lambda_k^\pm)d(\lambda_{k'}^{\prime\pm})}{\sqrt{\kappa_e^2-f_k^2}\sqrt{\kappa_e^{\prime 2}-f_{k'}^2}}\times$$

$$\left\{\pm i\left[\left(\frac{h}{s}+\frac{d^2}{hs}\right)\lambda_{k'}^{\prime\pm}+\frac{d}{sh}(\sigma'-2\pi k')-\right.\right.$$

$$\left.\left.\frac{h}{s}\frac{U}{a^2}(\omega+U\lambda_{k'}^{\prime\pm}-vW)\right]\right\}\times$$

$$e^{i[(\lambda_k^\pm-\lambda_{k'}^{\prime\pm})(x-yd/h)-[(\sigma-2\pi k)-(\sigma'-2\pi k')]y/h-(v-v')z]}dKdK'$$

where now the summations are over the limited ranges of k and k' corresponding to cut on (energy carrying) modes. From Glegg's analysis, it can be shown that the term in curly brackets { } is equal to $$\frac{is_e}{s}\sqrt{\kappa_e^{\prime 2}-f_{k'}^2}\,.$$

Hence, Equation 21 reduces to:

$$I_\omega^\pm=\frac{\rho_0\pi^2 c^4\omega}{\beta s s_e}\int\int S_{ww}(K,K',\omega)\sum_k\sum_{k'}\frac{\zeta_k^\pm \zeta_{k'}^{\prime\pm}D^*(\lambda_k^\pm)d(\lambda_{k'}^{\prime\pm})}{\sqrt{\kappa_e^2-f_k^2}}\times \qquad (22)$$

$$e^{i[(\lambda_k^\pm-\lambda_{k'}^{\prime\pm})(x-yd/h)-[(\sigma-2\pi k)-(\sigma'-2\pi k')]y/h-(v-v')z]}dKdK'$$

where $S_{ww}$ is the upwash spectrum:

$$S_{ww}(K,K',\omega)=\frac{2\pi}{T}W^*(K,\omega)W(K',\omega) \qquad (23)$$

Equations 22 and 23 are the most general form of the sound power spectrum. Equation 22 represents power per unit frequency per unit area of stator vane cascade face. It has been averaged over time but is still a function of the space variables x, y, z. However, the equations are generally too unwieldy for numerical work, considering the six-fold integral and double sum. The next portion of the analysis addresses the upwash spectrum and develops simplifications that lead to a tractable, computer-implementable form of Equations 22 and 23.

The expression (Equation 23) just derived for the generalized upwash spectrum $S_{ww}(K,K',\omega)$ is written in terms of vector wavenumber arguments. To proceed with its analysis, a coordinate system is chosen to represent the wavenumber vectors, and then the frozen turbulence assumption (Taylor's hypothesis) is applied. Then, before re-inserting $S_{ww}$ into Equation 22, the wavenumber coordinates are rotated into Glegg's cascade system to facilitate manipulation of the noise equation.

For reasons that will be apparent hereinafter, the preferred coordinate system for dealing with the turbulence inhomogeneity is the $x_0$, $y_0$, $z_0$ system (FIG. 5), as illustrated in FIGS. 8(a) and 8(b). Turbulence is convected along the $x_0$ axis. To ensure convergence of the Fourier integral, consider initially only a block of the flow, as indicated in FIG. 8(a). The streamwise and time extents of the flow source region are connected by the convection speed $U_0$. Eventually, the extent of the source region is allowed to approach infinity, and the desired sound power is found by integrating the intensity over only the portion of the stator cascade corresponding to the stator vane of interest. In the $z_0$ direction, the source region is taken to be finite; the final noise formulas include an integral over this variable.

To begin with, the transform of the velocity field given by Equation 15 is repeated below:

$$W(K,\omega)=\frac{1}{(2\pi)^4}\int\int w(x,t)e^{-i(K\cdot x-\omega t)}dxdt \qquad (24)$$

wherein the wave number and space variables are expressed explicitly. In the $x_0$, $y_0$, $z_0$ system, the wave number vector is written as $K=(k_x, k_y, k_z)$ so that $K\cdot x$ becomes $k_x x_0+k_y y_0+k_z z_0$. The velocity field in the fluid-fixed system is written as $\tilde{w}(x, y_0, z_0)$ where, by Taylor's hypothesis, it is time independent. With this notation, w can be written:

$$w(x,t)=\tilde{w}(x_0-U_0 t, y_0, z_0) \qquad (25)$$

Substituting into Equation 24 and changing integration variables via $\tilde{x}=x_0-U_0 t$ lead to:

$$W(K,\omega)= \qquad (26)$$

$$\frac{1}{(2\pi)^3}\int\int\int \tilde{w}(\tilde{x},y_0,z_0)e^{-i(k_x\tilde{x}+k_y y_0+k_z z_0)}\left[\frac{1}{2\pi}\int e^{i(\omega-k_x U_0)t}dt\right]$$

$$d\tilde{x}dy_0 dz_0$$

The expression in square brackets [0] is a delta function expressing the result of Taylor's hypothesis that frequency, stream-wise wave number, and convection velocity are related through $\omega=k_x U_0$. Thus:

$$W(K,\omega)= \qquad (27)$$

$$\delta(\omega,k_x U_0)\frac{1}{(2\pi)^3}\int\int\int \tilde{w}(\tilde{x},y_0,z_0)e^{-i(k_x\tilde{x}+k_y y_0+k_z z_0)}d\tilde{x}dy_0 dz_0$$

Substitution back to the expression for $S_{ww}$ in Equation 23 gives:

$$S_{ww}=\frac{2\pi}{T}\delta(\omega-k_x U_0)\delta(\omega-k_x' U_0)\frac{1}{(2\pi)^6} \qquad (28)$$

$$\int\int\int\int\int\int \tilde{w}(\tilde{x},y_0,z_0)\tilde{w}(\tilde{x}',y_0',z_0')\times e^{i(k_x\tilde{x}+k_y y_0+k_z z_0)}$$

$$e^{-i(k_x'\tilde{x}'+k_y' y_0'+k_z' z_0')}d\tilde{x}dy_0 dz_0 d\tilde{x}'dy_0'dz_0'$$

In Equation 28, the field points for the $\tilde{w}$'s are expressed independently. For extracting the covariance function below, the second field point is expressed based on a vector to the first plus a separation vector s via the following change of variables:

$$\tilde{x}'=\tilde{x}+s_x,\ y_0'=y_0+s_y,\ z_0'=z_0+s_z \qquad (29)$$

to get:

$$S_{ww}=\delta(\omega-k_x U_0)\delta(\omega-k_x' U_0)\times\frac{1}{(2\pi)^5 T} \qquad (30)$$

$$\int\int\int\int\int\int \tilde{w}(\tilde{x},y_0,z_0)\tilde{w}(\tilde{x}+s_x,y_0+s_y,z_0+s_z)\times$$

$$e^{i[(k_x-k_x')\tilde{x}+(k_y-k_y')y_0+(k_z-k_z')z_0]}$$

$$e^{-i(k_x's_x+k_y's_y+k_z's_z)}d\tilde{x}dy_0 dz_0 ds_x ds_y ds_z$$

Given the arguments of the two delta functions, then set $k_x=k_x'$, rearrange, and take the expected value (stochastic average) of both sides to get:

$$\langle S_{ww}\rangle = \delta(\omega - k_x U_0)\delta(\omega - k'_x U_0) \times \qquad (31)$$

$$\frac{U_0}{(2\pi)^5}\int\int\int\int\int\left[\frac{1}{U_0 T}\int \langle\tilde{w}(\tilde{x}, y_0, z_0)\right.$$

$$\left.\tilde{w}(\tilde{x}+s_x, y_0+s_y, z_0+s_z)\rangle d\tilde{x}\right]\times$$

$$e^{-i(k'_x s_x + k'_y s_y + k'_z s_z)} e^{i(k_y - k'_y)y_0} e^{i(k_z - k'_z)z_0}$$

$$dy_0 dz_0 ds_x ds_y ds_z$$

There now follows a critical argument regarding the quantity in square brackets [0] in Equation 31. Note that $\langle\tilde{w}(\tilde{x},y_0,z_0)\tilde{w}(\tilde{x}+s_x,y_0+s_y,z_0+s_z)\rangle$ is the covariance of the upwash velocity component. At this point, it is totally general; that is, a function of the position vector $(\tilde{x},y_0,z_0)$ and the separation vector $(s_x,s_y,s_z)$. Because $U_0 T$ is the extent of the block of flow in the $\tilde{x}$ direction (FIG. 8(a)), the quantity in square brackets [0] in Equation 31 is the streamwise average of this covariance. If T is chosen to give an integral number of wake passages, and if block of flow is extended in the $y_0$ direction, then this average over $\tilde{x}$ will be independent of $y_0$. With the average covariance now independent of both $\tilde{x}$ and $y_0$, it can be considered to represent the average at the stator face (still a function of radius $z_0$). This function is named R according to:

$$R(z_0, s) = \frac{1}{U_o T}\int \langle\tilde{w}(\tilde{x}, y_0, z_0)\tilde{w}(\tilde{x}+s_x, y_0+s_y, z_0+s_z)\rangle d\tilde{x} \qquad (32)$$

However, despite the integration variable, the average could be taken across the stator face at constant $z_0$. With the covariance function independent of $y_0$, the $y_0$ integral yields a delta function and Equation 31 becomes:

$$\langle S_{ww}\rangle = \frac{U_0}{2\pi}\delta(\omega - k_x U_0)\delta(\omega - k'_x U_0)\delta(k_y - k'_y) \times \qquad (33)$$

$$\int\left[\frac{1}{(2\pi)^3}\int\int\int R(z_0, s)e^{-iK'\cdot s}ds\right]e^{i(k_z - k'_z)z_0}dz_0$$

In the absence of the $z_0$ dependence, the quantity in square brackets would be the three-dimensional turbulence spectrum for homogeneous turbulence (See Landahl, M. T. et al., "Turbulence and Random Processes in Fluid Mechanics", Cambridge University Press, 1992). Hence, an analogous $z_0$ dependent spectrum is defined according to:

$$\phi_{ww}(z_0, K') = \frac{1}{(2\pi)^3}\int\int\int R(z_0, s)e^{-iK'\cdot s}ds \qquad (34)$$

so that:

$$\langle S_{ww}\rangle = U_0\delta(\omega - k_x U_0)\delta(\omega - k'_x U_0)\delta(k_y - k'_y) \qquad (35)$$

$$\frac{1}{2\pi}\int \phi_{ww}(z_0, K')e^{i(k_z - k'_z)z_0}dz_0$$

Before substituting this back to the acoustic equation, the $k_x$, $k_y$, $k_z$ wavenumbers must be expressed in the cascade system. This is accomplished by writing K·x in the cascade system and also in the $x_0$, $y_0$, $z_0$ system and equating them (because K·x is a scalar and therefore invariant under coordinate transformation):

$$k_x x_0 + k_y y_0 + k_z z_0 = \gamma_0 x + \alpha y + \nu z \qquad (36)$$

We can write x, y, z in terms of $x_0$, $y_0$, $z_0$, substitute on the right of Equation 36, and collect terms as follows:

$$k_x x_0 + k_y y_0 + k_z z_0 = (\gamma_0 \cos\psi_s + \nu\sin\psi_s)x_0 + \qquad (37)$$

$$(-\gamma_0 \sin\psi_l \sin\psi_s + \alpha\cos\psi_l + \nu\sin\psi_l \cos\psi_s)y_0 +$$

$$(-\gamma_0 \cos\psi_l \sin\psi_s + \alpha\sin\psi_l + \nu\cos\psi_l \cos\psi_s)z_0$$

Equating coefficients of the space variables leads to the desired wavenumber transformation:

$$k_x = \gamma_0 \cos\psi_s + \nu \sin\psi_s$$

$$k_y = -\gamma_0 \sin\psi_l \sin\psi_s + \alpha \cos\psi_l + \nu \sin\psi_l \cos\psi_s$$

$$k_z = -\gamma_0 \cos\psi_l \sin\psi_s - \alpha \sin\psi_l + \nu \cos\psi_l \cos\psi_s \qquad (38)$$

With these transformations, the desired goal of changing the representation of a band of turbulence oriented at constant radius in the duct is achieved. With the wavenumbers of Equation 38 substituted into Equation 35, $S_{ww}$ is now represented in the cascade coordinates where it runs diagonally across the vane leading edges. This is the form required for manipulation as follows.

Equation 22 can be written out with the wavenumber differentials shown explicitly as follows:

$$I_\omega^\pm = \frac{\rho_o \pi^2 c^4 \omega}{\beta s s_e}\int\int\int\int\int\int S_{ww}(K, K', \omega)\sum_k \sum_{k'} \frac{\zeta_k^\pm \zeta_{k'}^{\prime\mp} D^*(\lambda_k^\pm)D(\lambda_{k'}^{\prime\pm})}{\sqrt{\kappa_e^2 - f_k^2}} \times \qquad (39)$$

$$e^{i\{(\lambda_k^\pm - \lambda_{k'}^{\prime\mp})(x-yd/h)-[(\sigma-2\pi k)-(\sigma'-2\pi k')]y/h-(\nu-\nu')z\}}d\gamma_o d\alpha d\nu d\gamma'_o d\alpha' d\nu'$$

This is the intensity spectrum as a function of the x, y, z space variables. Acoustic power is its integral over y and z as follows. For z, integrate over all z, recalling that the source is finite in that direction (because, temporarily, it is finite in the y direction). For the y direction, integrate over a distance corresponding to the number of vanes V in the cascade. The derivation is simpler if the z integration is carried out first, then inserting the expression for $S_{ww}$, and then performing the y integral. The z integral simply yields a delta function so that:

$$\int I_\omega^\pm dz = \qquad (40)$$

$$\frac{\rho_o \pi^2 c^4 \omega}{\beta s s_e} \int\int\int\int\int\int S_{ww}(K, K', \omega) \sum_k \sum_{k'} \frac{\zeta_k^\pm \zeta_{k'}^{\prime\pm} D^*(\lambda_k^\pm) D(\lambda_{k'}^{\prime\pm})}{\sqrt{\kappa_e^2 - f_k^2}} 2\pi \delta(\nu -$$

$$\nu') \times e^{i[(\lambda_k^\pm - \lambda_{k'}^{\prime\pm})(x-yd/h) - [(\sigma - 2\pi k) - (\sigma' - 2\pi k')]y/h]} d\gamma_o d\alpha d\nu d\gamma_o' d\alpha' d\nu'$$

Then, when Equation 35 is inserted for $S_{ww}$ with the wavenumbers transformed via Equation 38 and the $\nu'$ integral is performed, the result is:

$$\int I_\omega^\pm dz = \frac{\rho_o \pi^2 c^4 \omega}{\beta s s_e} \times \qquad (41)$$

$$\int\int\int\int\int\int\int \delta[\omega - U_o(\gamma_o\cos\psi_s + \nu\sin\psi_s)]\delta[\omega - U_o(\gamma_o'\cos\psi_s + \nu\sin\psi_s)] \times$$

$$\delta[-(\gamma_o - \gamma_o')\sin\psi_l\sin\psi_s + (\alpha - \alpha')\cos\psi_l] \times \int \phi_{ww}(z_o, K')$$

$$e^{i[-(\gamma_o - \gamma_o')\cos\psi_l\sin\psi_s - (\alpha - \alpha')\sin\psi_l]}dz_o \times \sum_k \sum_{k'} \frac{\zeta_k^\pm \zeta_{k'}^{\prime\pm} D^*(\lambda_k^\pm) D(\lambda_{k'}^{\prime\pm})}{\sqrt{\kappa_e^2 - f_k^2}}$$

$$e^{i[(\lambda_k^\pm - \lambda_{k'}^{\prime\pm})(x-yd/h) - [(\sigma - 2\pi k) - (\sigma' - 2\pi k')]y/h]} d\gamma_o d\alpha d\nu d\gamma_o' d\alpha'$$

Note in the argument of the first delta function that $U_0 \cos \psi_s = U$ and $U_0 \sin \psi_s = W$ so that it becomes $\delta(\omega - \gamma_0 U - \nu W)$. This is equivalent to $\delta[\gamma_0 - (\omega - \nu W)/U]/U$ enabling the $\gamma_0$ and $\gamma'_0$ integrals. As a result, in the following it is implicit that $\gamma_0 = \gamma'_0 = \omega g/U$, where $\omega g$ is Glegg's shifted frequency $\omega - \nu W$. Equation 41 reduces to:

$$\int I_\omega^\pm dz = \frac{\rho_o \pi^2 c^4 \omega U_o}{\beta s s_e U^2} \qquad (42)$$

$$\int\int\int \delta[(\alpha - \alpha')\cos\psi_l] \int \phi_{ww}(z_o, K') e^{-i(\alpha - \alpha')z_o \sin\psi_l}$$

$$dz_o \times \sum_k \sum_{k'} \frac{\zeta_k^\pm \zeta_{k'}^{\prime\pm} D^*(\lambda_k^\pm) D(\lambda_{k'}^{\prime\pm})}{\sqrt{\kappa_e^2 - f_k^2}}$$

$$e^{i[(\lambda_k^\pm - \lambda_{k'}^{\prime\pm})(x-yd/h) - [(\alpha - \alpha')h - 2\pi(k-k')]y/h]} d\alpha d\nu d\alpha'$$

The remaining delta function can be re-written as $\delta(\alpha - \alpha')/\cos\psi_l$, enabling the $\alpha'$ integration:

$$\int I_\omega^\pm dz = \frac{\rho_o \pi^2 c^4 \omega}{\beta s s_e U \cos\psi_l \cos\psi_s} \int\int\int \phi_{ww}(z_o, K')dz_o \times \qquad (43)$$

$$\sum_k \sum_{k'} \frac{\zeta_k^\pm \zeta_{k'}^{\prime\pm} D^*(\lambda_k^\pm) D(\lambda_{k'}^{\prime\pm})}{\sqrt{\kappa_e^2 - f_k^2}}$$

$$e^{i[(\lambda_k^\pm - \lambda_{k'}^{\prime\pm})(x-yd/h) + 2\pi(k-k')y/h]} d\alpha d\nu$$

where $U = U_0 \cos \psi_s$. To complete the area integration, a coordinate $\eta$ parallel to the leading edges in the $z=0$ plane is defined. Note that $x - yd/h$ does not vary in this direction. Then, integrate over a distance equal to V vane gaps:

$$\int_0^{Vs} e^{i2\pi(k-k')\frac{\eta}{s}} d\eta = V s \delta_{kk'} \qquad (44)$$

The $k'$ summation can be completed via the Kroneker delta. With the primed wavenumbers and $k'$ equal to their unprimed counterparts, the primed and unprimed $\lambda$'s are equal and the exponential disappears completely.

The sound power emanating from the V vanes is:

$$\Pi_\omega^\pm = \qquad (45)$$

$$\frac{V\rho_o \pi^2 c^4 \omega}{\beta s_e U \cos\psi_l \cos\psi_s} \int\int \left[\int \phi_{ww}(z_o, K)dz_o\right] \sum_k \frac{|\zeta_k^\pm D(\lambda_k^\pm)|^2}{\sqrt{\kappa_e^2 - f_k^2}} d\alpha d\nu$$

This is the principal theoretical result of this analysis, and can be interpreted as follows. $\pi_\omega^\pm$ is the spectrum of sound power scattered upstream (+) and downstream (−) by the stator vane cascade as a result of interaction with turbulence described by the spectrum $\phi_{ww}$. Thus, to compute sound power in any frequency band, integrate according to:

$$\Pi_{ab}^\pm = 2 \int_{\omega_a}^{\omega_b} \Pi_\omega^\pm d\omega \qquad (46)$$

where the factor of 2 arises from the fact that the integration is only performed over positive frequencies. Equation 45 is the integral over the alpha $\alpha$ and $\nu$ wavenumbers of the product of the turbulence spectrum (in square brackets) and the power response spectrum of the cascade. The turbulence wavenumber K has three components: $\gamma_0$, $\alpha$, and $\nu$. The first of these, $\gamma_0$, is tied to the frequency by $\gamma_0 = (\omega - \nu W)/U$. The power response spectrum includes the factor in front of the integrals in Equation 45 and the k-summation. In performing the wavenumber integral, the ranges of $\alpha$ and $\nu$ are limited to cut on waves; this amounts values of the wavenumbers leading to a positive argument of the square root in Equation 45. Explicit formulas for this range are given hereinafter.

Equation 45 is not in the best form for computation because the response spectrum, which is time consuming to compute, is inside a double integral and a summation. This can be remedied by changing integration variables via the following procedure. First, move the summation outside the integrals in Equation 45 and make a slight change in notation by showing the components of the turbulence wavenumber explicitly as follows:

$$\Pi_\omega^\pm = \frac{V\rho_o\pi^2c^4\omega}{\beta s_e U \cos\psi_l \cos\psi_s}\sum_k \int\int \left[\int \phi_{ww}(z_o; \gamma_o, \alpha, v)dz_o\right]\frac{|\zeta_k^\pm D(\lambda_k^\pm)|^2}{\sqrt{\kappa_e^2 - f_k^2}}d\alpha dv \quad (47)$$

There is an $\alpha$ integral for each k in the sum. The origin of each of these integrals can be shifted by noting in Glegg's formulas that $\alpha$ only appears in the interblade phase angle $\sigma = \gamma_o d + \alpha h$. Furthermore, $\sigma$ appears only in the combination $\sigma - 2\pi k$. Thus, if the integration variables change via:

$$\alpha - 2\pi k/h = \alpha' \quad (48)$$

$\sigma - 2\pi k$ in the cascade response formulas changes to $\gamma_o d + \alpha' h$. With these changes, Equation 47 becomes:

$$\Pi_\omega^\pm = \frac{V\rho_o\pi^2c^4\omega}{\beta s_e U \cos\psi_l \cos\psi_s}\sum_k \int\int \left[\int \phi_{ww}(z_o; \gamma_o, \alpha' + 2\pi k/h, v)dz_o\right]\frac{|\zeta_0^\pm D(\lambda_0^\pm)|^2}{\sqrt{\kappa_e^2 - f_0^2}}d\alpha' dv \quad (49)$$

Since the cascade response term no longer depends on the k index, the expression can be rewritten in the final form:

$$\Pi_\omega^\pm = \frac{V\rho_o\pi^2c^4\omega}{\beta s_e U \cos\psi_l \cos\psi_s}\int\int \frac{|\zeta_0^\pm D(\lambda_0^\pm)|^2}{\sqrt{\kappa_e^2 - f_0^2}}\sum_k \left[\int \phi_{ww}(z_o; \gamma_o, \alpha + 2\pi k/h, v)dz_o\right]d\alpha dv \quad (50)$$

where the prime on the dummy variable $\alpha'$ is dropped. Programmed in software in this form, the inner loop has a summation on the turbulence spectrum that is more efficient than recomputing the cascade function per Equation 45. Equation 50 is the most general form of the noise theory for inhomogeneous turbulence impinging on a swept and/or leaned stator vane. It is provided as the basis for a noise prediction system for broadband rotor/stator interaction.

Use of the general noise prediction theory is illustrated herein by a simple application of the Liepmann turbulence spectrum for homogeneous turbulence. The Liepmann turbulence spectrum is one of the classic spectrum formulas for homogeneous/isotropic turbulence. See Liepmann, H. W., "Extension of the Statistical Approach to Buffeting and Gust Response of Wings of Finite Span", Journal of the Aeronautical Sciences, March 1955. This application illustrates how to integrate over a turbulence field, and how to transform wavenumbers for turbulence represented in different coordinate systems. This application serves as an illustration of the use of Equation 50. To apply Equation 50, initially the form of the turbulence spectrum must be addressed and then a non-dimensionalization is chosen suitable for programming and for plotting of sound power spectra in decibels. Finally, specific guidance is provided for the integration and summation ranges that are currently implied to be infinite.

In Equation 50, the turbulence spectrum is expressed symbolically as dependent on the wavenumber components $\gamma_o$, $\alpha$, $v$ aligned with the vanes as in Glegg's theory. Since lean and sweep are arbitrary, any turbulence spectrum used is likely to be based on other coordinates. For this application, Liepmann's spectrum is used:

$$\phi_{33} = \frac{2\overline{w^2}\Lambda^5}{\pi^2}\frac{k_1^2 + k_2^2}{([1 + \Lambda^2(k_1^2 + k_2^2 + k_3^2)])^3} \quad (51)$$

This applies to the upwash component which is associated to the "3" direction and whose mean square value is $\overline{w^2}$. $\Lambda$ is the integral scale of the turbulence. To relate the $k_1$, $k_2$, $k_3$ components to $\gamma_o$, $\alpha$, $v$, use the same technique applied earlier where K·x was equated in two different coordinate systems. One coordinate system is Glegg's x, y, z system. For the other, the system is used in which one coordinate is aligned with the flow and another coordinate is aligned with a vane normal. This is the primed system illustrated in FIG. 5. Thus:

$$k_1 x' + k_3 y' + k_2 z' = \gamma_o x + \alpha y + vz \quad (52)$$

Note that on the left side the "1" direction is associated with x', the flow direction, and the "3" direction is associated with y', which is the coordinate normal to the vane surface. By default, the "2" direction is aligned with z'. By substituting transformation equations relating the unprimed and primed coordinates and equating coefficients of x', y', and z', the desired connection is made as follows:

$$k_1 = \gamma_o \cos\psi_s + v \sin\psi_s$$

$$k_2 = -\gamma_o \sin\psi_s + v \cos\psi_s$$

$$k_3 = \alpha \quad (53)$$

However, recall that $\gamma_o$ was tied to frequency via $\gamma_o = (\omega - vW)/U$. By substituting this into the first of Equations 53 and applying the relations $U = U_0 \cos\psi_s$ and $W = U_0 \sin\psi_s$, $k_1$ reduces simply to:

$$k_1 = \omega/U_0 \quad (54)$$

The same expression for $\gamma_0$ leads to:

$$k_2 = -\frac{\omega}{U_o}\tan\psi_s + \frac{v}{\cos\psi_s} \tag{55}$$

Also note for use in Equation 53 that $\alpha+2\,\pi k/h$ is required, rather than just $\alpha$. Hence:

$$k_3 \to \alpha+2\,\pi k/h \tag{56}$$

Now, the turbulence spectrum is non-dimensionalized based on duct radius R, with the result:

$$\Phi_{33} = \overline{w^2}R^3\overline{\Phi}_{33} \tag{57}$$

where $$\overline{\Phi}_{33} = \frac{2}{\pi^2}\left(\frac{\Lambda}{R}\right)^5 K_1^2 + \frac{K_2^2}{\left[1+\left(\frac{\Lambda}{R}\right)^2(K_1^2+K_2^2+K_3^2)\right]^3} \tag{58}$$

and $K_1=k_1R$, etc. The non-dimensional wavenumbers can be written in the required form for use with $\overline{\Phi}_{33}$ in Equation 58:

$$\begin{aligned}K_1 &= \overline{\omega}/M_r \\ K_2 &= -(\overline{\omega}/M_r)\tan\psi_s + \frac{\overline{v}}{\overline{c}\cos\psi_s} \\ K_3 &= \frac{\overline{\alpha}}{\overline{c}} + \frac{2\pi k}{\overline{c}\overline{s}\cos\chi}\end{aligned} \tag{59}$$

The overbars imply non-dimensionalization as follows $$\overline{\omega}=\omega R/a \quad \overline{v}=vc \quad \overline{\alpha}=\alpha c \quad \overline{c}=c/R \quad \overline{s}=s/c \tag{60}$$

and $M_r=U_0/a$ is the Mach number associated with the total velocity vector.

To obtain power in any band of frequency, integrate the spectral density over $\omega$ according to Equation 46. For small enough bandwidth, however, simply multiply by $2\times\Delta\omega$. The factor of 2 is required to account for negative frequencies. This integrated quantity is referred to as PWR, which, with the above definitions applied to Equation 50, becomes:

$$PWR^\pm = \tag{61}$$

$$\frac{2\pi^2 V\rho_o a^2 M_r Ra}{\beta\overline{s}_e\cos\psi_l\cos^2\psi_s}\frac{\overline{w^2}}{U_o^2}\overline{\omega}\Delta\overline{\omega}\int\int F^\pm(\overline{\alpha},\overline{v})\sum_k\left[\int\Phi_{33}dz_o\right]d\overline{\alpha}d\overline{v}$$

where the cascade power response function (in non-dimensional form and without the constants leading Equation 50) is:

$$F^\pm(\overline{\alpha},\overline{v}) = \frac{|\zeta_0^\pm cD(\lambda_0^\pm)|^2}{\sqrt{c^2(\kappa_e^2-f_0^2)}} \tag{62}$$

The radial integration is performed over the turbulence (the inside integral) in a strip sense so that that integral can be approximated by $\Phi_{33}\Delta R$. The result for one strip is:

$$PWR^\pm = \frac{2\pi^2 V M_r\overline{\omega}\Delta\overline{\omega}}{\beta\overline{s}_e\cos\psi_l\cos^2\psi_s}\frac{\overline{w^2}}{U_o^2}[\rho_o a^2 R\Delta Ra]\int\int F^\pm(\overline{\alpha},\overline{v})\sum_k\overline{\Phi}_{33}d\overline{\alpha}d\overline{v} \tag{63}$$

The quantity in square brackets has the dimensions of power; the remainder of the expression is dimensionless. Power level in decibels is given by $$PWL^\pm = 10\log_{10}\left[\frac{PWR^\pm}{PWR_{REF}}\right] \tag{64}$$

where the power reference is $10^{-12}$ watts or $$PWR_{REF}=0.73756\times10^{-12}\text{ ft lb/sec} \tag{65}$$

The result is a working formula that can be coded in software for this particular application:

$$\frac{PWR^\pm}{PWR_{REF}} = \frac{2\pi^2 V M_r I^2\overline{\omega}\Delta\overline{\omega}}{\beta\overline{s}_e\cos\psi_l\cos^2\psi_s}\left[\frac{1.4P_o R\Delta Ra}{PWR_{REF}}\right]\int\int F^\pm(\overline{\alpha},\overline{v})\sum_k\overline{\Phi}_{33}d\overline{\alpha}d\overline{v} \tag{66}$$

where $\rho_o a^2=1.4P_0$ is utilized, 1.4 is the ratio of specific heats for air, and $P_0$ is the ambient pressure.

$$I^2 = \overline{w^2}/U_o^2$$

is the normalized mean square upwash velocity.

The remaining items to be considered for programming in software for this particular application are the limits on the integrals and sum in Equation 66. These are treated as follows. The double integral in Equation 66 is over the $\overline{\alpha},\overline{v}$ wavenumber plane. There is an ellipse in that plane such that wavenumbers inside it correspond to cut on waves and wavenumbers outside correspond to cut off waves. Cuton is governed by the square root in Equation 62. When the argument of the square root $$iE=k_e^2-f_k^2 \tag{67}$$

is positive, the waves are cut on. The cuton boundary is given by E=0, and k=0, in which case Equations 5 and 6 yield:

$$\kappa^2 - \frac{v^2}{\beta^2} - \frac{(\sigma + \kappa M d)^2}{s_e^2} = 0 \qquad (68)$$

This is the ellipse in the σ,ν wavenumber plane shown in the sketch below.

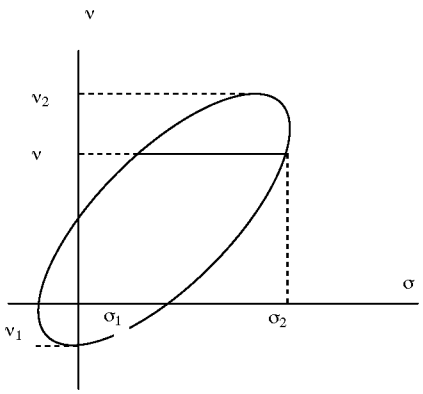

Equation 68 can be solved for σ as follows:

$$\sigma = -\kappa M d \pm s_e \sqrt{\kappa^2 - v^2/\beta^2} \qquad (69)$$

where, from Equations 3 and 5:

$$\kappa = \frac{\omega - vW}{a\beta^2} \qquad (70)$$

We will use the outside loop is used for $\bar{v}$ and integrated over the range of α corresponding to $\sigma_1 < \sigma < \sigma_2$ where:

$$\sigma_1 = -\kappa M d - s_e \sqrt{\kappa^2 - v^2/\beta^2} \qquad (71)$$
$$\sigma_2 = -\kappa M d + s_e \sqrt{\kappa^2 - v^2/\beta^2}$$

as shown in the sketch. The extremes of ν occur when the square roots above are equal to 0; that is, for:

$$v_{1,2} = \frac{\omega/a}{W/a \pm \beta} \qquad (72)$$

or in non-dimensional form for program coding in software as:

$$\bar{v}_1 = \frac{-\hat{\omega}}{\beta - M_r \sin\psi_s} \qquad (73)$$
$$\bar{v}_2 = \frac{\hat{\omega}}{\beta + M_r \sin\psi_s}$$

where $\hat{\omega} = \omega c/a$. Finally, since $\sigma = \gamma_0 d + \alpha h$, the range of α corresponding to Equation 71 is given by:

$$\alpha_1 = -(\gamma_o + \kappa M)\frac{d}{h} - \frac{s_e}{h}\sqrt{\kappa^2 - v^2/\beta^2} \qquad (74)$$
$$\alpha_2 = -(\gamma_o + \kappa M)\frac{d}{h} + \frac{s_e}{h}\sqrt{\kappa^2 - v^2/\beta^2}$$

This can be re-arranged and non-dimensionalized for programming as follows:

$$\bar{\alpha}_1 = -(\bar{\kappa}/M)\tan\chi - \sqrt{\beta^2 \bar{\kappa}^2 - \bar{v}^2}\big/\cos\chi_e \qquad (75)$$
$$\bar{\alpha}_2 = -(\bar{\kappa}/M)\tan\chi + \sqrt{\beta^2 \bar{\kappa}^2 - \bar{v}^2}\big/\cos\chi_e$$

where $\bar{\kappa} = \kappa c$.

In the software program code, the sum is initialized by the k=0 term. Then, a k loop runs from one to a large number, for example, thirty. The positive and negative terms are added in pairs until a convergence criterion is satisfied.

In this exemplary application, Equations 58, 59, 62, 66, 73 and 75 are coded in Fortran and executed by the computer or workstation 70. An exemplary input data set for this computer-implemented application of the noise prediction theory is illustrated in FIG. 9. The following inputs are selected by the user prior to computer program execution. In FIG. 9, line 1 is a comment line. In line 2, "G" is the gap/chord ratio, "theta" is stagger angle in degrees (measured from fan axis), "PsilD" and "PsisD" are the desired values for the lean and sweep angles, respectively, in degrees (in the "hat" convention of FIG. 6), and "Vanes" is the number of vanes in the stator cascade. In line 3, "Mr" is the stator inflow Mach number, "L" is turbulence length scale normalized by duct radius, and "I" is the rms upwash velocity normalized by the mean inflow velocity. Since the program code uses a homogeneous turbulence model in this exemplary application, "L" and "I" must represent values over a band of turbulence where the geometry, mean flow, and pitch averaged turbulence can be taken as uniform.

In line 4, "Po" and "Ao" are the ambient pressure and speed of sound, "R" is the radius to the center of the band of turbulence, and "DelR" is its width. The units of "Po", "R", "DelR", and "Ao" are foot pounds/sec. In line 5, constant bandwidth spectra or ⅓ OB spectra can be computed. In line 6, see the notes in FIG. 8 for specifying spectrum frequencies and bandwidths. Finally, in line 7, "DeltaAlf" and "DeltaNu" are step sizes for the α and ν integrations. The values used (0.80) have been tested (by using smaller step sizes) and found adequate for this case. Other conditions may require smaller steps.

In this exemplary embodiment, the computer program executes Equations 58, 59, 62, 66, 73 and 75, together with the input file of FIG. 9, to compute the output sound power spectra (noise) emanating from the fan section using the user-input desired values for vane lean and/or sweep. Output sound power spectra are displayed on a visual display screen, and may also be written to a file. For example, a plot of sound power spectra may be created by reading the file into a Microsoft Excel spreadsheet and using its plotting the "frozen gust" assumption, or Taylor's hypothesis. Turbulence at the stator face can be inhomogeneous and anisotropic. The source property required for a noise calculation is the radial integral of the pitch-wise average of the turbulence spectrum (or turbulence covariance function). The analysis contained herein gives the formulas for these operations on the turbulence spectrum or covariance function.

A special application of the theory has been developed by use of Liepmann's turbulence spectrum (which is normally used for homogeneous/isotropic turbulence). This application has been described and illustrated herein with explanations of the required wavenumber transformations and details needed for software program coding. Equations are shown in the non-dimensional form used by the software program code.

Although the present invention has been shown and described herein with respect to detailed embodiments thereof, it will be understood by those skilled in the art that various other changes in the form and detail thereof may be made without departing from the broadest scope of the claimed invention in light of the teachings herein.

Having thus described the invention, what is claimed is:

1. A method in a computer system for determining an amount of noise at an inlet to a stator vane cascade in a gas turbine engine, the cascade including a plurality of stator vanes, the cascade being disposed downstream of a rotor blade array in the gas turbine engine, the method comprising the steps of:
   inputting a value indicative of an angular physical positioning of at least one vane in the cascade;
   inputting a value indicative of an amount of turbulence emanating from the rotor blade array; and
   determining an amount of noise at the inlet to the stator vane cascade as a function of the value indicative of the angular physical positioning of the at least one vane in the cascade and as a function of the value for the amount of turbulence emanating from the rotor blade array.

2. The method of claim 1, wherein the value indicative of the angular physical positioning of at least one vane in the cascade is indicative of a sweep angle of the at least one vane in the cascade.

3. The method of claim 1, wherein the value indicative of the angular physical positioning of at least one vane in the cascade is indicative of a lean angle of the at least one vane in the cascade.

4. The method of claim 1, wherein the value indicative of the angular physical positioning of at least one vane in the cascade is indicative of both a lean angle and a sweep angle of the at least one vane in the cascade.

5. A computer system for determining an amount of noise at an inlet to a stator vane cascade in a gas turbine engine, the cascade including a plurality of stator vanes, the cascade being disposed downstream of a rotor blade array in the gas turbine engine, the computer system comprising:
   means for inputting a value indicative of an angular physical positioning of at least one vane in the cascade;
   means for inputting a value indicative of an amount of turbulence emanating from the rotor blade array; and
   means for determining an amount of noise at the inlet to the stator vane cascade as a function of the value indicative of the angular physical positioning of the at least one vane in the cascade as a function of the value for the amount of turbulence emanating from the rotor blade array.

6. The computer system of claim 5, wherein the value indicative of the angular physical positioning of at least one vane in the cascade is indicative of a sweep angle of the at least one vane in the cascade.

7. The computer system of claim 5, wherein the value indicative of the angular physical positioning of at least one vane in the cascade is indicative of a lean angle of the at least one vane in the cascade.

8. The computer system of claim 5, wherein the value indicative of the angular physical positioning of at least one vane in the cascade is indicative of both a lean angle and a sweep angle of the at least one vane in the cascade.

9. A computer-readable medium containing instructions for determining an amount of noise at an inlet to a stator vane cascade in a gas turbine engine, the cascade including a plurality of stator vanes, the cascade being disposed downstream of a rotor blade array in the gas turbine engine, by:
   inputting a value indicative of an angular physical positioning of at least one vane in the cascade;
   inputting a value indicative of an amount of turbulence emanating from the rotor blade array; and
   determining an amount of noise at the inlet to the stator vane cascade as a function of the value of the angular physical positioning of the at least one vane in the cascade and as a function of the value for the amount of turbulence emanating from the rotor blade array.

10. The computer-readable medium of claim 9, wherein the value indicative of the angular physical positioning of at least one vane in the cascade is indicative of a sweep angle of the at least one vane in the cascade.

11. The computer-readable medium of claim 9, wherein the value indicative of the angular physical positioning of at least one vane in the cascade is indicative of a lean angle of the at least one vane in the cascade.

12. The computer-readable medium of claim 9, wherein the value indicative of the angular physical positioning of at least one vane in the cascade is indicative of both a lean angle and a sweep angle of the at least one vane in the cascade.

* * * * *